US009834676B2

(12) United States Patent
Boerzsoenyi et al.

(10) Patent No.: US 9,834,676 B2
(45) Date of Patent: Dec. 5, 2017

(54) USES OF CONDENSATION RESINS

(71) Applicant: BASF SE, Ludwigshafen (DE)

(72) Inventors: Gabor Boerzsoenyi, Ludwigshafen (DE); Chunhong Yin, Ludwigshafen (DE); Benedikt Crone, Mannheim (DE); Miran Yu, Ludwigshafen (DE); Guenter Scherr, Ludwigshafen (DE); Klaus Menzel, Ludwigshafen (DE); Dieter Weilacher, Hassloch (DE)

(73) Assignee: BASF SE, Ludwigshafen (DE)

( * ) Notice: Subject to any disclaimer, the term of this patent is extended or adjusted under 35 U.S.C. 154(b) by 33 days.

(21) Appl. No.: 14/763,984

(22) PCT Filed: Feb. 14, 2014

(86) PCT No.: PCT/EP2014/042885
§ 371 (c)(1),
(2) Date: Jul. 28, 2015

(87) PCT Pub. No.: WO2014/125061
PCT Pub. Date: Aug. 21, 2014

(65) Prior Publication Data
US 2015/0361262 A1 Dec. 17, 2015

Related U.S. Application Data

(60) Provisional application No. 61/765,818, filed on Feb. 18, 2013.

(30) Foreign Application Priority Data

Feb. 18, 2013 (EP) ..................................... 13155589

(51) Int. Cl.
*C08L 63/00* (2006.01)
*C08L 75/02* (2006.01)
*C08G 12/12* (2006.01)
*C09D 163/00* (2006.01)

(52) U.S. Cl.
CPC .............. *C08L 75/02* (2013.01); *C08G 12/12* (2013.01); *C08L 63/00* (2013.01)

(58) Field of Classification Search
None
See application file for complete search history.

(56) References Cited

U.S. PATENT DOCUMENTS

| 4,243,797 | A | * | 1/1981 | Petersen | .............. C09D 161/24 528/232 |
| 5,102,960 | A | * | 4/1992 | Imai | .................... C08G 59/306 525/476 |
| 5,356,714 | A | * | 10/1994 | Fritsche | .............. C09D 163/00 427/386 |
| 5,985,987 | A | | 11/1999 | Adolfsson et al. | |
| 2012/0116047 | A1 | | 5/2012 | Meuer et al. | |

FOREIGN PATENT DOCUMENTS

| DE | 1 670 283 | | 1/1971 | |
| DE | 102004003764 a1 | * | 8/2005 | ............. C08L 33/12 |
| EP | 0002794 A1 | * | 7/1979 | ............. C08G 12/12 |
| EP | 0 167 960 A2 | | 1/1986 | |
| EP | 0507202 A1 | * | 10/1992 | ............. C09D 17/00 |
| GB | 1 462 538 A | | 1/1977 | |
| JP | 2001-187810 A | * | 7/2001 | ............. C08G 14/09 |
| WO | WO 97/08255 A1 | | 3/1997 | |
| WO | WO 2007/028752 A1 | | 3/2007 | |
| WO | WO 2011/009765 A1 | | 1/2011 | |
| WO | WO 2013/027156 A1 | | 2/2013 | |

OTHER PUBLICATIONS

Machine translation of JP 2001187810 A (no date).*
Machine translation of DE 102004003764 A1 (no date).*
Machine translation of EP 0507202 A1 (no date).*
International Search Report dated Sep. 11, 2014 in PCT/EP2014/052885.

* cited by examiner

*Primary Examiner* — Michael J Feely
(74) *Attorney, Agent, or Firm* — Oblon, McClelland, Maier & Neustadt, L.L.P.

(57) ABSTRACT

The present invention relates to new uses of condensation resins made from urea, formaldehyde, and CH-acidic aldehydes.

17 Claims, No Drawings

USES OF CONDENSATION RESINS

The present invention relates to new uses of condensation resins made from urea, formaldehyde, and CH-acidic aldehydes.

Condensation products made from urea and/or derivatives thereof with formaldehyde and CH-acidic aldehydes are already known from the patent literature. Condensation resins of these kinds are frequently used for the provision of pigment preparations.

For the provision of such pigment preparations, these condensation resins require mixing with organic solvents in order to adjust the viscosity. Owing to statutory regulations, however, there is a need to reduce consumption of low-viscosity condensation resins in order thereby to reduce the consumption of organic solvents as well and so to lower the level of volatile organic compounds (VOCs).

DE-A 1670283 discloses a process for preparing hexahydropyrimidine derivatives by reacting ureas with isobutyraldehyde and formaldehyde in an acidic medium in the presence of long-chain alcohols.

After the end of this reaction, the product is neutralized and the volatile constituents are removed by distillation.

EP 167960 A2 discloses a process in which urea is reacted with, for example, isobutyraldehyde in the presence of an acid and optionally in the presence of one or more alcohols and the product is then subjected to condensation with formaldehyde in the presence of at least one alcohol.

After the end of this reaction the volatile constituents are removed by distillation.

Common to these reaction regimes is that the condensation resins are synthesized by reacting alcohols in the presence of at least of the following components: isobutyraldehyde, urea, and formaldehyde.

A disadvantage is that preparations comprising condensation resins obtained in these ways still always have a relatively high viscosity.

WO 2011/009765 discloses a method for producing condensation resins wherein the completed resin is reacted with diols for the purpose of stabilization. This, however, leads to intermolecular crosslinking and hence to an increase in the viscosity of the resin.

The unpublished international patent application with the file reference PCT/IB2012/054151 and the filing date of Aug. 15, 2012 discloses the preparation of low-viscosity condensation resins through reaction of a substantially fully reacted condensation resin, synthesized from at least one, preferably precisely one, urea, formaldehyde, and at least one, preferably precisely one, CH-acidic aldehyde, with at least one monofunctional alcohol in the presence of at least one Brønsted acid.

Epoxide compounds are in diverse industrial use and constitute an important class of polymeric resins. The applications properties of epoxide compounds are usually brought about by additization—for example, by addition of pigments, flame retardants, flow assistants, thixotropic assistants, diluents, and fillers. Additives of these kinds are commonly incorporated into the epoxide compounds via auxiliaries. There is a constant demand for new auxiliaries with which additives can be incorporated more easily into epoxide compounds.

It was an object of the present invention to develop a method for incorporating additives into epoxide compounds that allows extremely good mixing with the epoxide compound and that influences the properties of the epoxide compound positively or at least not negatively.

The object has been achieved by means of a method of incorporating additives into epoxide compounds that comprises a first step of mixing with one another at least one additive and at least one condensation resin synthesized from at least one, preferably precisely one, urea, formaldehyde, and at least one, preferably precisely one, CH-acidic aldehyde, and a second step of incorporating the resulting mixture of condensation resin and additive into at least one epoxide compound.

Epoxide compounds are common knowledge and are used, on account of their toughness, flexibility, adhesion, and chemical resistance, as materials for surface coating, as adhesives, and for shaping and laminating. Epoxide compounds are used more particularly in the production of composite materials with carbon fiber or glass fiber reinforcement. The use of epoxide compounds in casting, potting, and encapsulating in the electrical industries and tooling industries as well is known.

Epoxide compounds in accordance with the present specification possess 2 to 10, preferably 2 to 6, very preferably 2 to 4, and more particularly 2 epoxide groups. The epoxide groups are more particularly glycidyl ether groups, of the kind formed in the reaction of alcohol groups with epichlorohydrin.

The epoxide compounds may be low molecular weight compounds, with an average molar weight (Mn) in general of less than 1000 g/mol, or may be compounds of higher molecular weight (polymers).

The average epoxy equivalent weight is 140 to 3000 g/mol, preferably 170 to 950, and more preferably 180 to 450 g/mol.

Such polymeric epoxide compounds preferably have a degree of oligomerization of 2 to 25, more preferably of 2 to 10 units.

These may be aliphatic, including cycloaliphatic, compounds, or compounds having aromatic groups. More particularly, the epoxide compounds are compounds having two aromatic or aliphatic 6-membered rings, or oligomers thereof.

Of importance industrially in particular are epoxide compounds which are obtainable by reaction of epichlorohydrin with compounds which have at least two reactive H atoms, more particularly with polyols.

Of particular importance are epoxide compounds which are obtainable by reaction of epichlorohydrin with compounds which contain at least two, preferably two hydroxyl groups and two aromatic or aliphatic 6-membered rings.

Such compounds include more particularly bisphenol A and bisphenol F, and also hydrogenated bisphenol A and bisphenol F.

Epoxide compounds typically used in accordance with this specification are bisphenol A diglycidyl ethers (DGEBA). Suitable epoxide compounds according to this invention are also tetraglycidylmethylenedianiline (TG-MDA) and triglycidylaminophenol or mixtures thereof. Also contemplated are reaction products of epichlorohydrin with other phenols, as for example with cresols or phenol-aldehyde adducts, such as phenol-formaldehyde resins, more particularly Novolaks. Also suitable are epoxide compounds which do not derive from epichlorohydrin. Examples of those contemplated include epoxide compounds which contain epoxide groups through reaction with glycidyl (meth)acrylate).

It is preferred in accordance with the invention to use epoxide compounds or mixtures thereof that are liquid at room temperature (25° C.).

Amino hardeners in the sense of the present invention are compounds having at least one primary or at least two secondary amino group(s). Preferred amino hardeners are isophoronediamine (IPDA), dicyandiamide (DICY), diethylenetriamine (DETA), triethylenetetramine (TETA), bis(p-aminocyclohexyl)methane (PACM), Polyetheramine D230 (CAS 9046-10-0, poly-1,2-propylene glycol ether having two terminal primary amino groups and a molar weight of about 230 g/mol, amine number 454-488), Dimethyldicykan (DMDC), diaminodiphenylmethane (DDM), diaminodiphenyl sulfone (DDS), 2,4-toluenediamine, 2,6-toluenediamine, 2,4-diamino-1-methylcyclohexane, 2,6-diamino-1-methylcyclohexane, 2,4-diamino-3,5-diethyltoluene, and 2,6-diamino-3,5-diethyltoluene, and also mixture thereof. Particularly preferred amino hardeners for the curable composition are isophoronediamine (IPDA), dicyandiamide (DICY), and Polyetheramine D230.

In one preferred embodiment of the present invention the at least one condensation resin is a condensation resin obtained by reaction of at least one substantially fully reacted condensation resin synthesized from at least one, preferably precisely one, urea, formaldehyde, and at least one, preferably precisely one, CH-acidic aldehyde with at least one monofunctional alcohol in the presence of at least one Brønsted acid.

By "substantially fully reacted" here is meant that the synthesis components of the condensation resins, viz. urea, formaldehyde, and CH-acidic aldehyde, have undergone reaction with one another to an extent of at least 95%, preferably at least 98%, more preferably at least 99%, and very preferably at least 99.5%.

The free formaldehyde content of the substantially fully reacted condensation resin ought to be below 5 wt %, preferably below 3, more preferably below 2, very preferably below 1, and more particularly below 0.5 wt %.

The unreacted urea content of the substantially fully reacted condensation resin ought to be below 2 wt %, preferably below 1, more preferably below 0.5, and very preferably below 0.1 wt %.

The unreacted CH-acidic aldehyde content of the substantially fully reacted condensation resin ought to be below 3 wt %, preferably below 2, more preferably below 1, and very preferably below 0.5 wt %.

The stated conversion and the low synthesis components content are preferably achieved by halting the reaction in the preparation of the substantially fully reacted condensation resin, by neutralizing a catalyst present in the reaction, and then by at least partly, preferably substantially, removing the volatile constituents by distillation.

Preferred condensation resins are synthesized from at least one, preferably precisely one, urea, formaldehyde, and at least one, preferably precisely one, CH-acidic aldehyde, where ureas of the general formula (I) and/or (II)

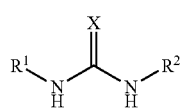

(I)

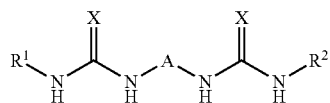

(II)

in which $R^1$ and $R^2$ independently of one another are hydrogen or identical or different $C_1$-$C_{20}$ alkyl radicals, A is a $C_1$-$C_{20}$ alkylene radical and X is oxygen or sulfur, with formaldehyde and a CH-acidic aldehyde of the general formula (III)

(III)

in which the radicals $R^3$ and $R^4$ independently of one another are identical or different alkyl, cycloalkyl, aryl, or alkylaryl radicals, or $R^3$ and $R^4$ together may form a ring.

They are preferably obtainable by reacting the synthesis components in the temperature range between 60 and 150° C. in the presence of acid or bases, optionally in the presence of solvent and/or diluent, and after the end of the reaction, neutralizing the acids or bases, distillatively removing volatile constituents, and then reacting the product with at least one alcohol in the presence of at least one acid.

Condensation products of these kinds have, for example, a lower viscosity than products which have not undergone reaction with alcohols.

This allows an increased solids content of pigment preparations, thereby reducing the need to use solvents, and so allowing lower organic emissions (VOCs).

Generally speaking, condensation resins have a number-average molar weight $M_n$ of 300 to less than 3000 g/mol, preferably of 400 to 2500 g/mol, and more preferably of 500 to 2000 g/mol, a weight-average molar weight $M_w$ of 500 to 6000, and a polydispersity of 1.2 to 3.0, preferably 1.3 to 2.5.

Generally speaking, condensation resins have an acid number to DIN EN 2114 of less than 10 mg KOH/g, preferably of less than 8, more preferably of less than 5, very preferably of less than 4 mg KOH/g.

The preferred condensation resins generally have a hydroxyl number to DIN ISO 4629 of 5 to 150 mg KOH/g, preferably of 20 to 130 mg KOH/g.

Preferred condensation resins generally have a number-average molar weight $M_n$ of 300 to less than 1000 g/mol, preferably of 400 to 950 g/mol, and more preferably of 500 to 900 g/mol, a weight-average molar weight $M_w$ of 500 to 2000, and a polydispersity of 1.2 to 3.0, preferably 1.3 to 2.5.

The values for the number-average and weight-average molecular weights $M_n$ and $M_w$ were determined by means of measurements made by gel permeation chromatography on PL-GEL (3-column combination; 1×Mini-Mix C and 2×Mini-Mix E). The eluent used was THF. Calibration was carried out using polystyrene/hexylbenzene reference materials with polydispersities of <1.1. The stated values, unless for polymers of styrene, are therefore to be considered as polystyrene equivalents. Reference materials used: polystyrene of 3 000 000 to 580 g/mol, and hexylbenzene 162 g/mol. The method is described in Analytiker Taschenbuch vol. 4, pages 433 to 442, Berlin 1984.

The preferred condensation resins generally have an acid number to DIN EN 2114 of less than 10 mg KOH/g, preferably of less than 8, more preferably of less than 5, very preferably of less than 3, more particularly less than 2, and in special cases less than 1 mg KOH/g.

The preferred condensation resins generally have a hydroxyl number to DIN ISO 4629 of 5 to 150 mg KOH/g, preferably of 20 to 130, more preferably of 50 to 120, and very preferably of 70 to 110 mg KOH/g.

The resulting condensation resins generally have a saponification number to DIN 53401 of less than 100 mg KOH/g, preferably of 5 to 90, more preferably of 10 to 70, and very preferably of 20 to 50 mg KOH/g.

The resulting condensation resins generally have a residual aldehyde (III) monomer content, more particularly a residual isobutyraldehyde content, of less than 500 ppm by weight, preferably of less than 400 ppm by weight, and more preferably of less than 300 ppm by weight.

The resulting condensation resins generally have a residual formaldehyde content of less than 500 ppm by weight, preferably of less than 400 ppm by weight, more preferably of less than 300 ppm by weight, very preferably of less than 200, and more particularly of less than 100 ppm by weight.

The resulting condensation resins generally have a glass transition temperature $T_g$ by the DSC method (Differential Scanning Calorimetry) to ASTM 3418/82 with a heating rate of 2.5° C./min of less than 70° C., preferably of less than 60, more preferably of less than 30, very preferably of less than 20° C., and more particularly of less than 10° C.

Regarding the synthesis components of the condensation resins, the following may be stated individually:

Suitable ureas are those of the general formula (I) or (II)

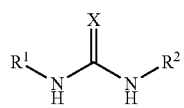

(I)

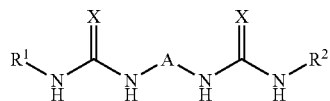

(II)

in which $R^1$ and $R^2$ independently of one another are hydrogen or identical or different $C_1$-$C_{20}$, preferably $C_1$- to $C_4$ alkyl radicals, A is a $C_1$-$C_{20}$, preferably $C_1$ to $C_4$, more preferably $C_1$ to $C_3$, and very preferably $C_1$ to $C_2$ alkylene radical, and X is oxygen or sulfur, preferably oxygen.

Besides urea or thiourea it is also possible to use mono- and disubstituted ureas and also alkylenediureas.

Urea ($H_2N$—(CO)—$NH_2$) serves preferably for preparing the condensation resins.

The formaldehyde may be used as an aqueous solution with a strength, for example, of 30% to 55%, preferably 35% to 49%, more preferably 40% to 49%, as paraformaldehyde, or in the form of trioxane, tetroxane, or formaldehyde acetals, and preferably in aqueous solution.

Since the condensation proceeds via hydroxymethylureas, the ureas and the formaldehyde can also be replaced by using the corresponding hydroxymethylureas.

These compounds may be generated preferably by a preliminary condensation of the formaldehyde with urea in situ, with the resulting reaction mixture from the preliminary condensation preferably being employed in the method.

For a preliminary condensation of this kind, urea and formaldehyde are reacted in a molar ratio of 1:1 to 1:15, preferably 1:3 to 1:10, more preferably 1:7 to 1:9, at temperatures of 20° C. to 120° C., preferably 50-120° C., for a time of 10 minutes to 6 hours. This reaction takes place, in one preferred embodiment, at pH levels of up to 6 and, in another preferred embodiment, in the alkaline range, as for example at pH levels of at least 8, preferably at least 9, and very preferably at least 10. The water of reaction that is formed here may be left in the reaction mixture, or else may be removed together with the water introduced through use of aqueous formaldehyde, this removal taking place by distillation or stripping, for example, preferably by azeotropic distillation with an entrainer.

The precondensed reaction mixture thus obtained is then, in one preferred embodiment, employed in the method, and the formaldehyde and urea employed in the preliminary condensation are taken into account with regard to the reaction stoichiometry.

CH-acidic aldehydes may be those of the general formula (III)

(III)

in which the radicals $R^3$ or $R^4$ independently of one another are identical or different $C_1$-$C_{20}$, preferably $C_1$ to $C_4$ alkyl, $C_3$-$C_{20}$, preferably $C_5$ to $C_{12}$ cycloalkyl, $C_6$-$C_{20}$, preferably $C_6$ to $C_{12}$ aryl, or alkylaryl radicals, or $R^3$ and $R^4$ together may form a ring. CH-acidic aldehydes are those which have precisely one hydrogen atom on the carbon atom $C_\alpha$ adjacent to the carbonyl group.

Examples of $C_1$-$C_{20}$ alkyl radicals are methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, and 1,1,3,3-tetramethylbutyl.

Examples of $C_3$-$C_{20}$ cycloalkyl radicals are cyclopropyl, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, and norbornyl.

Examples of $C_6$-$C_{20}$ aryl or alkylaryl radicals are phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, benzyl, 1-phenylethyl, 2-phenylethyl, α,α-dimethylbenzyl, benzhydryl, p-tolylmethyl, and 1-(p-butylphenyl)ethyl.

$C_1$-$C_4$ alkyl for the purposes of this specification means methyl, ethyl, isopropyl, n-propyl, n-butyl, isobutyl, sec-butyl, and tert-butyl, preferably methyl, ethyl, n-propyl, and n-butyl, more preferably methyl and ethyl, and very preferably methyl.

Examples of radicals $R^1$ and $R^2$ are independently of one another hydrogen and $C_1$ to $C_4$ alkyl, preferably hydrogen and methyl, and more preferably hydrogen.

Possible alkylene radicals A are, for example, methylene, 1,2-ethylene, 1,2-propylene, 1,3-propylene, 1,4-butylene, 1,6-hexylene, 2-methyl-1,3-propylene, 2-ethyl-1,3-propylene, 2,2-dimethyl-1,3-propylene, and 2,2-dimethyl-1,4-butylene.

Preferred radicals A are methylene, 1,2-ethylene, 1,2-propylene, and 1,3-propylene, more preferably methylene and 1,2-ethylene, and more preferably, methylene.

Preferably radicals $R^3$ and $R^4$ independently of one another are preferably alkyl or cycloalkyl, more preferably $C_1$ to $C_4$ alkyl, very preferably methyl, ethyl, n-propyl, and n-butyl, more particularly methyl, ethyl, and n-butyl, and especially methyl.

Where the radicals $R^3$ and $R^4$ together with the carbon atom $C_\alpha$ adjacent to the carbonyl group form a ring, the ring in question is preferably a five- to twelve-membered ring, as for example cyclopentyl, cyclohexyl, cyclooctyl, or cyclododecyl, preferably cyclopentyl, cyclohexyl, or cyclododecyl, and more preferably cyclopentyl or cyclohexyl.

Examples of CH-acidic aldehydes are preferably CH-acidic aldehydes having exclusively alkyl and/or cycloalkyl groups, more preferably isobutyraldehyde, 2-ethylhexanal, 2-methylpentanal, and isovaleraldehyde, very preferably isobutyraldehyde, 2-ethylhexanal, and 2-methylpentanal, and more particularly isobutyraldehyde.

For the preferred method, urea, formaldehyde, and CH-acidic aldehyde are used generally in a molar ratio of 1:2 to 15:2 to 15, preferably of 1:3 to 12:3 to 12, more preferably of 1:3.8 to 9:3.8 to 9.

Suitable acids are organic and inorganic acids, preferably acids having a $pK_A$ of up to 3. Examples thereof are sulfuric acid, phosphoric acid, nitric acid, hydrochloric acid, phosphorous acid ($H_3PO_3$), diphosphoric acid ($H_4P_2O_7$), sulfonic acids, more preferably methanesulfonic acid, trifluoromethanesulfonic acid, para-toluenesulfonic acid, benzenesulfonic acid, dodecylbenzenesulfonic acid, cyclododecanesulfonic acid, camphorsulfonic acid, sulfuric acid or acidic ionic exchangers with sulfonic acid groups, and also formic acid.

It is also possible, although less preferred, to subject the condensation to basic catalysis. To that end it is possible to use basic alkali metal compounds, alkaline earth metal compounds, or quaternary ammonium compounds, preferably alkali metal compounds, more preferably sodium potassium, very preferably sodium, examples being oxides, hydroxides ($OH^-$), carbonates ($CO_3^{2-}$), amides ($NH_2^-$), or $C_1$ to $C_{20}$ alkoxides, preferably hydroxides or $C_1$ to $C_4$ alkoxides, more preferably hydroxides, methoxides, ethoxides, or tert-butoxides, very preferably hydroxides or methoxides.

The catalyst is used generally in amounts of 0.5 to 30 mol %, based on the CH-acidic aldehyde, preferably in amounts of 2 to 20, more preferably 3 to 10 mol %.

Especially if basic compounds are used it is also possible, additionally, for phase transfer catalysts to be added.

Preferred phase transfer catalysts are tetrasubstituted ammonium salts, more preferably of the formula

$^+NR^5R^6R^7R^8X^-$, in which
$R^5$ to $R^8$ in each case independently of one another are $C_1$ to $C_{20}$ alkyl or $C_6$ to $C_{20}$ alkylaryl radicals and
$X^-$ is an anion of an acid.

The radicals $R^5$ to $R^8$ preferably have in total at least 8, preferably at least 12, more preferably at least 15 carbon atoms.

Examples of anions $X^-$ are chloride, bromide, iodide, sulfate, methylsulfate, ethylsulfate, methyl-carbonate, trifluoromethanesulfonate, $C_1$-$C_{20}$ alkylsulfonate or $C_6$-$C_{20}$ alkylarylsulfonate.

The condensation is carried out generally in the temperature range between 60 and 150° C., preferably 80 and 100° C.

When carrying out the method it is possible to use solvents and/or diluents, and possibly also entraining agents as well, for the azeotropic removal of water. Suitable solvents for the azeotropic removal of water include, in particular, aliphatic, cycloaliphatic, and aromatic hydrocarbons or mixtures thereof. Employed with preference are n-pentane, n-hexane, n-heptane, cyclohexane, methylcyclohexane, benzene, toluene or xylene. Particularly preferred are cyclohexane, methylcyclohexane, xylene, and toluene.

Aromatic hydrocarbons in particular have proven themselves as solvents. Among these, xylene is deserving of particular emphasis.

The conversion rate may be determined, for example, from the amount of water discharged, or alternatively by monitoring of the viscosity of the reaction mixture. Preference is given to the conversion rate relative to the aldehyde functions that have already reacted. The free aldehyde functions are preferably determined by the method of De Jong (DIN EN ISO 9020), and the unreacted CH-acidic aldehyde is determined by gas chromatography. The conversion rate thus determined ought in general to be at least 30%, preferably at least 40%, more preferably at least 50%, very preferably at least 60%, and more particularly at least 70%.

The resin obtained from the condensation is generally dissolved in at least one, preferably precisely one, solvent, preferably cyclohexane, methylcyclohexane, xylene or toluene, more preferably xylene, and neutralized in a scrubber. After an acid-catalyzed condensation, then, washing takes place with at least one aqueous base, and, after a basically catalyzed condensation, scrubbing takes place with at least one aqueous acid.

The slightly basic or acidic organic phase obtained from the scrubber can then be neutralized again with an acid or a base, to give a virtually neutral organic phase.

The scrub may be carried out, for example, in a stirred vessel or in other conventional apparatus, as for example in a column or mixer-settler apparatus.

In terms of process engineering, for a scrub in the method it is possible to use all conventional extraction and scrubbing techniques and apparatus, examples being those described in Ullmann's Encyclopedia of Industrial Chemistry, 6th ed., 1999 Electronic Release, Section: Liquid-Liquid Extraction Apparatus. These techniques may be, for example, single-stage or multistage, preferably single-stage, extractions, and also extractions carried out in cocurrent or countercurrent mode, preferably countercurrent mode.

It is preferred to use sieve tray columns or columns packed with stacked or dumped packings, or else to use stirred vessels or mixer-settler apparatus, and also columns having rotating internals.

The finished condensation resin is then obtained by removing the organic solvent from this organic phase by distillation.

The distillation is carried out preferably under reduced pressure, distillatively or rectificatively. This may be supported optionally by stripping with a suitable unreactive gas.

A single-stage distillation takes place preferably in a falling film evaporator, a climbing film evaporator, a thin film evaporator, a long tube evaporator or a helical tube evaporator, more preferably in a falling film evaporator.

Rectifying takes place in rectifying columns of known construction with separation-active internals (e.g., bubble cap, Thormann, valve, sieve or dual-flow trays) or beds or directed packings. The columns generally have 10-30 theoretical plates. The condensers are likewise of a known construction, examples being tube or plate heat exchangers.

The condensation resin obtained after distillation is subsequently solidified, for example by pelletizing, in other words by application of droplets to a cooling surface, as for example a steel belt or steel plate, on which the droplets are to solidify at rest typically within several minutes, or else by flaking, in other words by application of a film to a cooling surface, as for example a steel belt or a roller, on which the film is to undergo conversion to a layer of solid within a few minutes, this layer being subsequently removable with a blade to give fragments, these being the flakes.

Likewise possible is the spraying of the melt into a cooled gas in order to produce droplets, which are intended to solidify into a disperse solid as they fall through the gas.

The solid condensation resin obtained in these ways is subsequently stored and/or packed.

It is of course also possible, rather than solidifying the resultant condensation resin, to leave it or to dissolve it in a solvent or solvent mixture and to further process it in liquid form.

The preferred reaction of the substantially fully reacted condensation resin with at least one alcohol (V) may take place at any desired point in time after the condensation resin has been prepared, as for example directly after the distillative removal of the volatile constituents or else after prolonged storage of the condensation resin.

In one preferred embodiment, the reaction with the at least one alcohol (V) is carried out based on the above-described scrubbed or neutralized organic phase. If required, this phase can be provided with further solvent, but in general the organic phase is used as it is in the reaction.

The reaction may preferably be carried out with at least one, as for example one to three, preferably one to two, and more preferably precisely one alcohol (V), preferably an alkanol, more preferably a $C_1$ to $C_{20}$ alkanol, very preferably a $C_1$ to $C_{10}$ alkanol, and especially a $C_1$ to $C_8$ alkanol.

Examples of alcohols, in addition to the alkanols recited below, are, for example, alkylene glycol monoalkyl ethers and polyalkylene glycol monoalkyl ethers having a molar weight of up to 300 g/mol, preferably polyethylene glycol monoalkyl ethers and polypropylene glycol monoalkyl ethers of the formula HO—[—$X_i$—]$_n$—$R^9$, in which n is a positive integer from 1 to 5, preferably from 1 to 4, more preferably from 1 to 3, and very preferably 1 or 2, and $R^9$ is a $C_1$-$C_{20}$, preferably a $C_1$ to $C_4$ alkyl radical, and
each $X_i$ for i=1 to n may be selected independently of any from the group

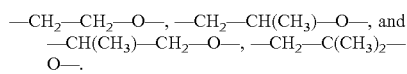

Preference is given to ethylene glycol monomethyl ether, ethylene glycol monoethyl ether, ethylene glycol monobutyl ether, and 1,3-propanediol monomethyl ether.

Examples of alkanols are methanol, ethanol, isopropanol, n-propanol, n-butanol, isobutanol, sec-butanol, tert-butanol, n-pentanol, n-hexanol, n-heptanol, n-octanol, 2-ethylhexanol, 3-propylhexanol, n-decanol, n-dodecanol (lauryl alcohol), stearyl alcohol, and cetyl alcohol.

Preferred compounds (V) are methanol, ethanol, isopropanol, n-propanol, n-butanol, and 2-ethylhexanol, more preferably methanol, ethanol and n-butanol, very preferably methanol and n-butanol, and more particularly n-butanol.

In one exemplary embodiment, the condensation resin to be reacted can be dissolved in a sufficient amount of the alcohol (V) and then reacted.

In a further, preferred embodiment, the condensation resin to be reacted is dissolved in a suitable solvent and reacted with, for example, 10 to 100, preferably 20 to 80, and very preferably 30 to 60 wt % of alcohol (V), based on the condensation resin.

Conceivable solvents are the above-stated hydrocarbons, ketones, ethers, and esters. Preferred are n-pentane, n-hexane, n-heptane, cyclohexane, methylcyclohexane, benzene, toluene, xylene, acetone, methyl ethyl ketone, ethyl acetate, butyl acetate, methylglycol acetate, ethylglycol acetate, methoxypropyl acetate, butylglycol, tetrahydrofuran, dioxane, and ethylglycol ether.

For the catalysis of the reaction, the reaction mixture is admixed with up to 1 wt %, based on the condensation resin, of at least one, preferably precisely one, Brønsted acid, preferably 0.05 to 0.5, more preferably 0.08 to 0.3, and more preferably 0.1 to 0.2 wt % of Brønsted acid. The pH of the reaction mixture ought preferably to be 2 to 5, preferably 3 to 4.

Suitable Brønsted acids are organic and inorganic acids, preferably acids having a $pK_a$ of up to 3. Examples thereof are sulfuric acid, phosphoric acid, nitric acid, hydrochloric acid, phosphorous acid ($H_3PO_3$), diphosphoric acid ($H_4P_2O_7$), sulfonic acids, examples being methanesulfonic acid, trifluoromethanesulfonic acid, para-toluenesulfonic acid, benzenesulfonic acid, dodecylbenzenesulfonic acid, cyclododecanesulfonic acid, camphorsulfonic acid or acidic ion exchangers with sulfonic acid groups, and also formic acid. Preference is given to sulfuric acid, phosphoric acid, nitric acid, and hydrochloric acid, particular preference to sulfuric acid.

Condensation resin and alcohol (V) are reacted with one another for 1 to 10 hours, preferably 2 to 8 hours, and more preferably 2 to 7 hours, and very preferably 2 to 4 hours at a temperature of 40 to 100° C., preferably 50 to 80° C.

When the desired molecular weight or conversion has been reached, the condensation is stopped.

The reaction is stopped by neutralization with a base, such as sodium or potassium alkoxide, for example, and preferably NaOH or KOH, and the excess alcohol (V) present in the reaction mixture, and also any lower oligomers or unreacted monomers that can be separated off by distillation, are removed by distillation or stripping.

The alcohol (V) is generally separated off to a residual level of not more than 5 wt %, preferably not more than 4 wt %, more preferably not more than 3 wt %, very preferably not more than 2 wt %, and more particularly not more than 1 wt %.

If solvent was present during the reaction, it is likewise separated off, preferably by distillation, to a residual level of not more than 5 wt %, preferably not more than 4 wt %, more preferably not more than 3 wt %, very preferably not more than 2 wt %, and more particularly not more than 1 wt %.

The reaction is possible batchwise and continuously.

The condensation resins described are used in accordance with the invention for incorporating additives into epoxide compounds.

Preferred additives are pigments, flame retardants, flow assistants, thixotropic assistants, diluents, and fillers.

Pigments, according to CD Römpp Chemie Lexikon—Version 1.0, Stuttgart/New York: Georg Thieme Verlag 1995, with reference to DIN 55943, are particulate "colorants that are organic or inorganic, chromatic or achromatic, and are virtually insoluble in the application medium".

Virtually insoluble here means a solubility at 25° C. of below 1 g/1000 g of application medium, preferably below 0.5, more preferably below 0.25, very preferably below 0.1, and more particularly below 0.05 g/1000 g of application medium.

Examples of pigments P encompass any desired systems of absorption pigments and/or effect pigments, preferably absorption pigments. There are no restrictions whatsoever on the number and selection of the pigment components.

They may be adapted as desired to the particular requirements, such as the desired perceived color, for example.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments, for example; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, or liquid-crystal pigments.

The color-imparting absorption pigments are, for example, customary organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments and carbon black.

Titanium dioxide, additionally, may be cited as a pigment.

Examples of pigments P are listed in WO 97/08255, page 8 line 11 to page 11 line 16, hereby part of the disclosure content of this specification.

Examples of diluents (or thinners) V are aromatic and/or (cyclo)aliphatic hydrocarbons and mixtures thereof, halogenated hydrocarbons, esters, and ethers.

Preference is given to aromatic hydrocarbons, (cyclo) aliphatic hydrocarbons, alkyl esters of alkanoic acids, alkoxylated alkyl esters of alkanoic acids, and mixtures thereof.

Particularly preferred are mono- or polyalkylated benzenes and naphthalenes, alkyl esters of alkanoic acids and alkoxylated alkyl esters of alkanoic acids, and mixtures thereof.

Especially preferred are xylene and 1-methoxy-2-propyl acetate.

Preferred aromatic hydrocarbon mixtures are those which comprise predominantly aromatic $C_7$ to $C_{14}$ hydrocarbons and may span a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising them.

Examples thereof are the Solvesso® products from ExxonMobil Chemical, particularly Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell. Hydrocarbon mixtures comprising paraffins, cycloparaffins, and aromatics are also available commercially under the names Kristalloel (for example Kristalloel 30, boiling range about 158-198° C., or Kristalloel 60: CAS No. 64742-82-1), white spirit (for example, likewise CAS No. 64742-82-1) or solvent naphtha (light: boiling range about 155-180° C., heavy: boiling range about 225-300° C.). The aromatics content of hydrocarbon mixtures of these kinds is generally more than 90% by weight, preferably more than 95%, more preferably more than 98%, and very preferably more than 99% by weight. It may be useful to use hydrocarbon mixtures having a particularly reduced naphthalene content.

Halogenated hydrocarbons are, for example, chlorobenzene and dichlorobenzene or the isomer mixtures thereof.

Esters are, for example, n-butyl acetate, ethyl acetate, 1-methoxy-2-propyl acetate, and 2-methoxyethyl acetate.

Ethers are, for example, THF, dioxane, and the mono- and dimethyl, -ethyl or -n-butyl ethers of ethylene glycol, diethylene glycol, triethylene glycol, propylene glycol, dipropylene glycol or tripropylene glycol.

(Cyclo)aliphatic hydrocarbons are, for example, decalin, alkylated decalin, and isomer mixtures of linear or branched alkanes and/or cycloalkanes.

Additionally preferred are n-butyl acetate, ethyl acetate, 1-methoxy-2-propyl acetate, 2-methoxyethyl acetate, and also mixtures thereof, more particularly with the aromatic hydrocarbon mixtures recited above.

For adjustment of the viscosity, the condensation resins prepared in accordance with the invention are formulated preferably as a 70% to 90% strength solution in xylene or 1-methoxy-2-propyl acetate.

In one preferred embodiment the mixtures of the invention comprise at least one flame retardant.

Examples of flame retardants are inorganic compounds, such as aluminum oxide hydrates, zinc borates, ammonium phosphates, and antimony oxide, halogenated organic compounds, such as, for example, chlorinated paraffins, polychlorinated biphenyls, hexabromobenzene, polybrominated diphenyl ethers (PBDEs), polybrominated biphenyls, adducts of hexachlorocyclopentadiene, for example with cyclooctadiene, tetrabromobisphenol A, tetrabromophthalic anhydride, and dibromoneopentyl glycol, organic phosphorous compounds, especially phosphates, phosphites, and phosphonates, such as, for example, tricresyl phosphate and tert-butylphenyl diphenyl phosphate, and also halogenated organic phosphorous compounds, such as, for example, tris(2,3-dibromopropyl)phosphate, tris(2-bromo-4-methylphenyl)phosphate, and tris(2-chloroisopropyl)phosphate. Preferred are inorganic compounds and brominated compounds, especially tetrabromobisphenol A.

One preferred embodiment comprises a first step of mixing with one another at least one additive and at least one condensation resin, and a second step of incorporating the resulting mixture of condensation resin and additive into at least one epoxide compound.

It is likewise conceivable, though less preferred, to react additive, condensation resin, and epoxide compound with one another in one step.

For the mixing, at least one additive, preferably at least one pigment P, and at least one condensation resin K are mixed with one another, preferably in a stirring vessel, mixer, extruder or, more preferably, in a disperser or kneader. The resulting mixture, comprising at least one additive and at least one condensation resin, is subsequently mixed with at least one epoxide compound and also, optionally, with further adjuvants. This may take place in the same apparatus as above, preferably in an extruder, disperser, or kneader.

The present invention hence also provides mixtures comprising at least one additive, preferably selected from the group consisting of pigments, flame retardants, flow assistants, thixotropic assistants, diluents, and fillers, at least one condensation resin, preferably having a number-average molar weight $M_n$ of 300 to less than 3000 g/mol and a weight-average molar weight $M_w$ of 500 to 2000 g/mol, and at least one epoxide compound.

Provided preferably by the present invention are mixtures comprising at least one additive, preferably selected from the group consisting of pigments, flame retardants, flow assistants, thixotropic assistants, diluents, and fillers, at least one condensation resin, preferably having a number-average molar weight $M_n$ of 300 to less than 1000 g/mol and a weight-average molar weight $M_w$ of 500 to 2000 g/mol, an acid number to DIN EN 2114 of less than 10 mg KOH/g, and a hydroxyl number to DIN ISO 4629 of 5 to 150 mg KOH/g, and at least one epoxide compound.

Preferred mixtures have the following composition:

0.2 to 25 wt %, preferably 1 to 20, more preferably 2 to 15 wt % of at least one additive, 0.1 to 10 wt %, preferably 0.2 to 5 wt % of at least one condensation resin, 65 to 99.4 wt %, preferably 70 to 99 wt %, more preferably 75 to 98 wt % of at least one epoxide compound, with the proviso that the sum total is always 100 wt %.

In the case of fillers as additive, their amount in the mixtures of the invention may in an individual case be up to 50 wt %.

It is an advantage of the method of the invention and of the mixtures of the invention that the condensation resins are highly compatible with the epoxide compounds and the resulting mixtures exhibit a shortened gel time and/or cure time relative to comparable systems without condensation resin.

The mixtures of the invention are suitable for the coating of substrates, such as plastics, glass, wood, chipboard, paper, and metal, examples being iron panels, using customary application techniques, such as brushing, spraying, or pouring, or as molding compositions.

The parts and percentages given in the examples are parts by weight and percentages by weight, respectively.

EXAMPLES

Example 1

Epoxide compound: Baxxores® ER 2200 (commercially available bisphenol A-epichlorohydrin resin from BASF SE, Ludwigshafen)

Curing agent: Baxxodur® EC 2120 (commercially available epoxide hardener from BASF SE, Ludwigshafen, comprising predominantly 1,3-cyclohexylenebis(methylamine) as diamine)

Adjuvant: 2% pigment paste based on Laropal® A81 with 20% pigment content (Heliogen® Blue L7101 as blue pigment)

0.2% pigment paste based on Laropal A81 with 20% pigment content (Heliogen® Blue L7101 as blue pigment)

The pigment paste was composed of 32 parts of Laropal A81 (60% methoxypropyl acetate), 32.5 parts of methoxypropyl acetate, 10.5 parts of EFKA® 4330 (dispersing assistant), and the stated amount of the pigment indicated.

Mixing ratio: 100/20.6 Baxxores® ER 2200/Baxxodur® EC 2120+2% or 0.2% pigment paste, based on the batch.

Laropal A81® from BASF SE Ludwigshafen is a condensation product of an aliphatic aldehyde with urea and formaldehyde, having an acid number of not more than 3 mg KOH/g, a hydroxyl number of about 40 mg KOH/g, and a glass transition temperature as determined by DSC of 57° C.

Procedure:

The viscosity was measured at 120° C. in a cone-plate viscosimeter (from Anton Paar GmbH).

The viscosity here is measured in rotation of up to 2000 mPas, and in oscillation thereafter.

| Baxxores ER 2200/Baxxodur EC 2120 (100/20.6) + 2% Laropal (blue) | |
| --- | --- |
| Initial viscosity [mPa · s] | 13.2 |
| Open time [min] | 0.367 |
| Gel point [min] | 0.9 |
| Curing [min] | 3 |
| Baxxores ER 2200/Baxxodur EC 2120 (100/20.6) + 0.2% Laropal (blue) | |
| Initial viscosity [mPa · s] | 17.5 |
| Open time [min] | 0.35 |
| Gel point [min] | 0.87 |
| Curing [min] | 2.53 |
| Baxxores ER 2200/Baxxodur EC 2120 (100/20.6) without adjuvant | |
| Initial viscosity [mPa · s] | 17.6 |
| Open time [min] | 0.27 |
| Gel point [min] | 0.75 |
| Curing [min] | 2.45 |

It is apparent that the cure rate is affected hardly at all by the addition of the color paste. Many additives influence the curing kinetics to a substantially greater extent.

Furthermore, samples of each of the above mixtures were subjected to DSC analysis in order to ascertain the extent to which the glass transition temperature is affected by the mixtures.

| Sample | Onset ° C. | Peak max ° C. | ΔH J/g | $1^{st}$ Tg ° C. | $2^{nd}$ Tg ° C. |
| --- | --- | --- | --- | --- | --- |
| 2% Laropal blue | 51.4 | 82.1 | 554 | 142.2 | 142.7 |
| 0.2% Laropal blue | 50 | 81.6 | 542.9 | 148.5 | 149.1 |
| No Laropal blue | 51.6 | 82.5 | 500 | 147.6 | 147.5 |

| Temperature program | |
| --- | --- |
| 0-180° C. | 5 K/min |
| 180° C. | 30 min isothermal |
| 180-0° C. | 20 K/min |
| 0° C.-200° C. | 20 K/min |

It is apparent that the glass transition temperature of the mixtures is affected hardly at all by the addition of the color paste. Many additives influence the glass transition temperature to a substantially greater extent.

Examples 2 and 3

Resin: Baxxores® ER 2200

Curing agent: dicyandiamide (DSH-100 from AlzChem AG, cyanoguanidine)

Catalyst: imidazole derivate

Adjuvant: pigment paste based on Laropal A81 with 25% pigment content (carbon black)

The pigment paste was composed of 32 parts of Laropal A81 (60% methoxypropyl acetate), 32.5 parts of methoxypropyl acetate, 10.5 parts of EFKA® 4330 (dispersing assistant), and the stated amount of the pigment indicated.

The individual components were mixed with one another, as stated in the table below, and Tg, gel time at 140° C., and curing time at 140° C. were ascertained.

| | Epoxy resin Baxxores ER2200 | DSH-100 | Imidazole derivate | Laropal black | Tg ° C. | Gel time | Curing time |
| --- | --- | --- | --- | --- | --- | --- | --- |
| Comparative | 100 | 6 | 1 | 0 | 163 | 2.8 min | 6.8 min |
| Example 2 | 100 | 6 | 1 | 0.5 | 160 | 1.9 min | 5.4 min |
| Example 3 | 100 | 6 | 1 | 1 | 160 | 2.0 min | 6.1 min |

It is apparent that the addition of the condensation resin produces only a small effect on the glass transition temperature of the resin. At the same time the systems display a shortened gel time and curing time.

Examples 4 to 7

Resin: Baxxores® ER 2200
Curing agent: dicyandiamide (DSH-100)
Catalyst: imidazole derivate
The following mixtures were prepared:

|  | Baxxores ER2200 | DSH-100 | Cat | Laropal black | EP CM15 | S TNF | PE PE39 | Tg ° C. | Gel time @140° C. | Curing time @ 140° C. |
|---|---|---|---|---|---|---|---|---|---|---|
| For comp. | 100 | 6 | 1 |  |  |  |  | 163 | 2.8 min | 6.8 min |
| 4 | 100 | 6 | 1 | 0.5 |  |  |  | 160 | 1.9 min | 5.4 min |
| 5 | 100 | 6 | 1 |  | 0.5 |  |  | 156 | 3.3 min | 7.1 min |
| 6 | 100 | 6 | 1 |  |  | 0.5 |  | 155 | 3 min | 7 min |
| 7 | 100 | 6 | 1 |  |  |  | 0.5 | 159 | 3.4 min | 9 min |

It is apparent that the addition of the condensation resin (inventive example 4) produces only a small effect on the glass transition temperature and reactivity of the resin.

In contrast, when using the commercial products Temacolor™ EP CM15 (epoxy-based carbon black paste from CPS Color) and Temacolor™ S TNF (solvent-based, from CPS Color), a glass transition temperature reduced by about 7-8° C. is observed (noninventive examples 5 and 6).

The commercial carbon black paste Auricolor™ PE PE39 from CPS Color, although displaying a small influence on the glass transition temperature, nevertheless exhibited a prolonged curing time (noninventive example 7).

Examples 8 to 11

Resin: Baxxores® ER 2200
Curing agent: dicyandiamide (DSH-100)
Catalyst: imidazole derivate
The following mixtures were prepared and used to produce plates by casting of the mixtures between two metal sheets of size 220*340 mm in a thickness of 4 mm. Curing took place over 0.5 hour at 80° C., followed by 1 hour at 140° C.

The flexural strength and breaking strength of the plates was ascertained, and additionally the modulus of elasticity, force, and maximum rotation before fracture by tensile strength DIN EN ISO 527-2 (specimen 1A) and flexural test DIN EN ISO 178 (specimen 80×10×4 mm) were ascertained.

|  |  |  |  | Flexural strength | | | Breaking strength | | |
|---|---|---|---|---|---|---|---|---|---|
| Ex. | Baxxores ER2200 | Cat. | Laropal black | E-modulus_f Mpa | σ_fM Mpa | ε_fM % | E-modulus Mpa | σ_M Mpa | ε_M % |
| 8 | 100 | 5 | 0 | 2978 | 105.30 | 5.82 | 2905 | 58.24 | 2.96 |
| 9 | 100 | 5 | 0.5 | 3053 | 100.96 | 5.05 | 2914 | 63.26 | 3.34 |

|  |  |  |  |  | Flexural strength | | |
|---|---|---|---|---|---|---|---|
| Ex. | Baxxores ER2200 | DSH-100 | Cat. | Laropal Black | E-modulus_f Mpa | σ_fM Mpa | ε_fM % |
| 10 | 100 | 9 | 1 | 0 | 3314 | 129.66 | 6.14 |
| 11 | 100 | 9 | 1 | 0.5 | 3463 | 133.02 | 5.83 |

It is apparent that adding the condensation resin (inventive examples 9 and 11 in comparison to the noninventive examples 8 and 10) has no adverse effect on breaking strength (tensile strength) and flexural strength.

The invention claimed is:

1. A method for incorporating at least one additive(s) into a composition comprising at least one epoxide compound(s), comprising:
   mixing the at least one additive with at least one condensation resin, wherein the at least one condensation resin comprises condensed units of formaldehyde, at least one urea, and at least one CH-acidic aldehyde, then
   mixing the resulting mixture of the at least one condensation resin and the at least one additive(s) with the composition comprising at least one epoxide compound(s) and at least one of a curing agent and a catalyst to form a curable epoxide mixture,
   wherein the curable epoxy mixture comprises from 1 to 20 wt % of the at least one additive, from 0.2 to 10 wt % of the at least one condensation resin, and 70 to 98.8 wt % of the at least one epoxide compound(s) where wt % is based on 100 wt % of the combined amounts of the at least one additive, the at least one condensation resin, and the at least one epoxide compound(s), and
   wherein the at least one additive is selected from the group consisting of a pigment, a flame retardant, a flow assistant, a thixotropic assistant, a diluent, and a filler.

2. The method according to claim 1, wherein the at least one epoxide compound(s) have 2 to 10 epoxide groups.

3. The method according to claim 1, wherein the at least one epoxide compound(s) have a number-average molar weight (Mn) of less than 1000 g/mol.

4. The method according to claim 1, wherein the at least one epoxide compound(s) are compounds having two aromatic or aliphatic six-membered rings or oligomers thereof.

5. The method according to claim 1, wherein the at least one condensation resin has a number-average molar weight $M_n$ of 300 to less than 3000 g/mol and a weight-average molar weight $M_w$ of 500 to 2000.

6. The method according to claim 1, wherein the at least one condensation resin has a number-average molar weight $M_n$ of 300 to less than 1000 g/mol and a weight-average molar weight $M_w$ of 500 to 2000.

7. The method according to claim 1, wherein the at least one condensation resin has a hydroxyl number to DIN ISO 4629 of 5 to 150 mg KOH/g.

8. The method according to claim 1, wherein the at least one condensation resin has a hydroxyl number to DIN ISO4629 of 50 to 120 mg KOH/g.

9. The method according to claim 1, wherein the at least one condensation resin has a glass transition temperature $T_g$ by the DSC method (Differential Scanning calorimetry) to ASTM 3418/82 with a heating rate of 2.5° C./min of less than 70° C.

10. The method according to claim 1, wherein the at least one condensation resin comprises condensed units of urea, formaldehyde, and isobutyraldehyde.

11. The method according to claim 1, wherein the mixing of the at least one additive with the at least one condensation resin takes place in a stirring vessel, mixer, extruder, disperser, or kneader.

12. The method of claim 1, wherein the at least one condensation resin comprises condensed units of formaldehyde, precisely one urea, and precisely one CH-acidic aldehyde.

13. The method of claim 1, further comprising: curing the curable epoxide mixture to form a cured composition.

14. The method of claim 1, wherein the curable epoxy mixture comprises from 2 to 15 wt % of the at least one additive, from 0.2 to 5 wt % of the at least one condensation resin, and 75 to 97.8 wt % of the at least one epoxide compound(s), where wt % is based on 100 wt % of the combined amounts of the at least one additive, the at least one condensation resin, and the at least one epoxide compound(s).

15. A curable epoxy composition comprising
at least one of a curing agent and a catalyst,
1 to 20 wt % of at least one additive,
0.2 to 10 wt % of at least one condensation resin, wherein the at least one condensation resin comprises condensed units of formaldehyde, at least one urea, and at least one CH-acidic aldehyde, and
70 to 98.8 wt % of at least one epoxide compound,
where wt % is based on 100 wt % of the combined amounts of the at least one additive, the at least one condensation resin, and the at least one epoxide compound(s), and
wherein the at least one additive is selected from the group consisting of a pigment, a flame retardant, a flow assistant, a thixotropic assistant, a diluent, and a filler.

16. The composition of claim 15 wherein the at least one condensation resin has a number-average molar weight $M_n$ of 300 to less than 3000 g/mol and a weight-average molar weight $M_w$ of 500 to 2000 g/mol.

17. The curable epoxy composition of claim 15, comprising:
2 to 15 wt % of the at least one additive,
0.2 to 5 wt % of the at least one condensation resin, and
75 to 97.8 wt % of the at least one epoxide compound,
where wt % is based on 100 wt % of the combined amounts of the at least one additive, the at least one condensation resin, and the at least one epoxide compound(s).

* * * * *

UNITED STATES PATENT AND TRADEMARK OFFICE
CERTIFICATE OF CORRECTION

PATENT NO. : 9,834,676 B2
APPLICATION NO. : 14/763984
DATED : December 5, 2017
INVENTOR(S) : Gabor Boerzsoenyi et al.

It is certified that error appears in the above-identified patent and that said Letters Patent is hereby corrected as shown below:

On the Title Page

Item (86), the PCT information is incorrect. Item (86) should read:
-- (86) PCT No.: PCT/EP2014/052885
     § 371 (c)(1),
     (2) Date: Jul. 28, 2015 --

Signed and Sealed this
Fourth Day of September, 2018

Andrei Iancu
*Director of the United States Patent and Trademark Office*